Figure 1:
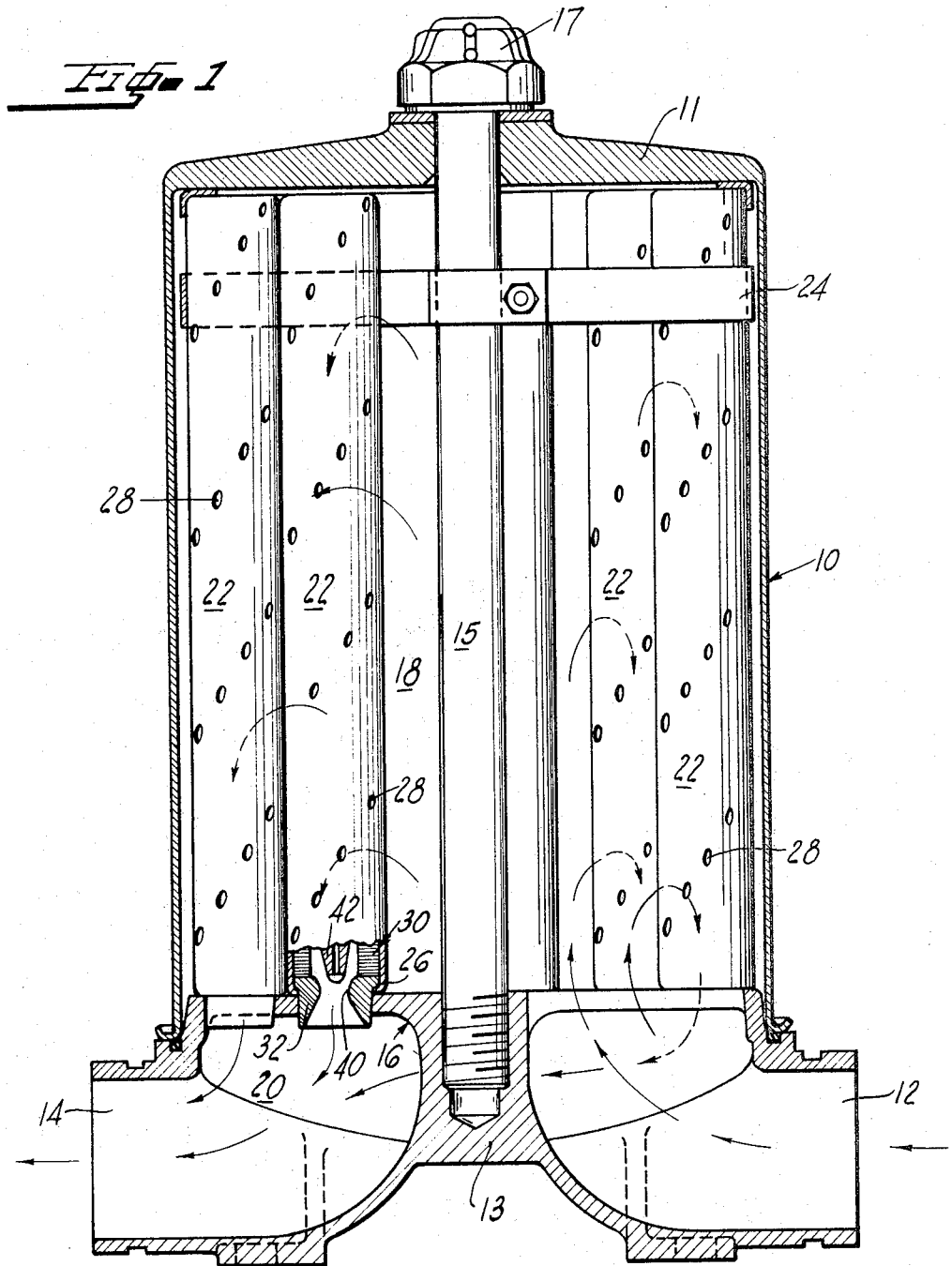

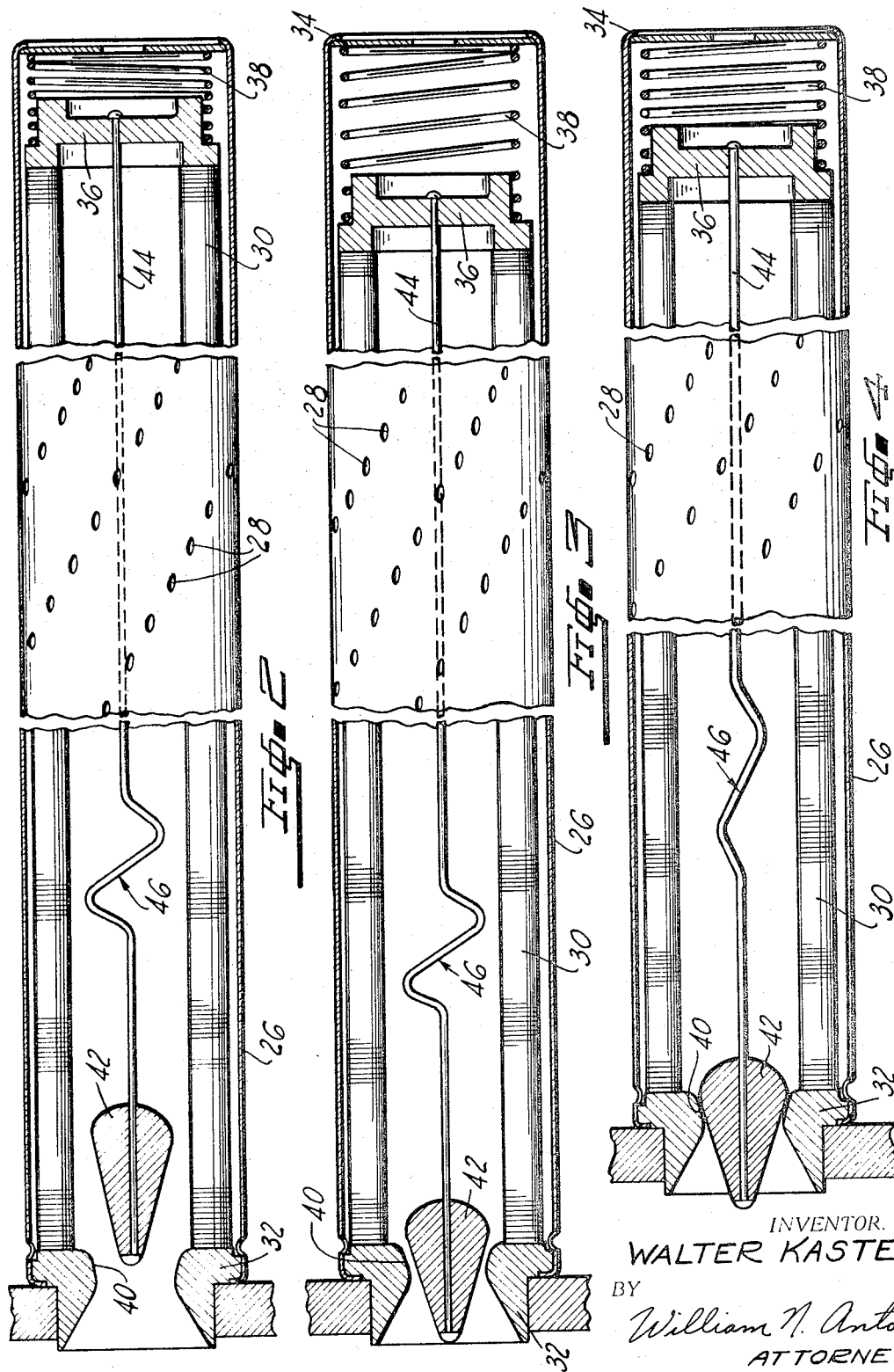

United States Patent Office 3,339,735
Patented Sept. 5, 1967

3,339,735
FILTER UNIT WITH PRESSURE RESPONSIVE VALVE MEANS
Walter Kasten, Madison Heights, Mich., assignor to The Bendix Corporation, a corporation of Delaware
Continuation of application Ser. No. 491,650, Sept. 30, 1965. This application Dec. 22, 1966, Ser. No. 604,067
12 Claims. (Cl. 210—100)

This application is a continuation of my copending application Ser. No. 491,650, filed Sept. 30, 1965 and now abandoned.

This invention relates to a filter unit of the type which may be used as a fuel monitoring device and more particularly to improvements in a fuel quality testing device of the type described in my Patent No. 3,117,925.

In most installations fuel monitoring devices of the type described in my above referenced patent are located downstream of conventional filter water separators. In such installations the fuel monitoring devices will normally operate for long periods of time without being exposed to large amounts of contamination. During such normal operations, the pressure drop through the fuel monitoring device will build up gradually, and the fuse elements will be replaced after a scheduled time interval, e.g. six months, or when the pressure differential across the fuse elements reaches a predetermined value, e.g. 15 to 20 p.s.i. Under such conditions, the fuse elements of the fuel will trap and retain all, or most all, of the solid and water contaminants in the fuel flowing therethrough.

More recently, in many installations fuel monitoring devices have been effectively utilized in place of filter water separators rather than in combination therewith. Even in such installations, if the fuel is of average quality, that is, contains only relatively small quantities of water and solid contamination, the fuse elements will have no difficulty in retaining or trapping the contamination. However, in such installations, certain operating conditions can occur which will cause small quantities of water to seep between the layers forming the edge-type fuse elements and flow to the outlet port of the fuel monitoring device. For example, if the fuel monitoring device is utilized in place of a filter water separator and the device is used at a fraction of its rated flow (25% or less), and if, in addition the pumping system used to pump the fuel through the device has only a rather limited low operating pressure, then in those situations when the fuel flowing therethrough is contaminated with a high percentage of water, it will be possible for some of the water to seep through the fuse elements. The reason for this is that, under such conditions of limited flow and low pumping pressure, the piston in the fuse element cannot compress the edge-type filter element sufficiently to completely close off the pores between the layers and prevent further flow through the element. Thus, under such conditions, if the level of the water in the fuel monitoring device rises high enough to submerge part of the fuse elements, some of this water can seep through the elements.

In view of the foregoing it is an object of this invention to provide a fuel monitoring device which will function properly under all foreseeable operating conditions.

Another object of this invention is to provide a novel fuse element construction which will prevent water seepage therethrough.

In other words, it is an object of this invention to provide a "seepage proof" fuse element for use in a fuel monitoring device.

More specifically, it is an object of this invention to provide a fuse element construction which utilizes the compression of the edge-type filter therein and motion of the fuse piston to insert a valve plug into the fuse outlet nipple at pressure differentials above a predetermined value.

A further object of this invention is to provide a connector between the fuse piston and valve plug which is effectively non-deformable while the piston moves the plug towards the outlet nipple, but is deformable after the plug is locked within the outlet nipple and the piston moves away from the nipple.

The above and other objects and features of this invention will become apparent from the following description taken in connection with the accompanying drawings which form a part of this specification and in which:

FIGURE 1 is a view partially in section of a fuel monitoring device incorporating my invention; and FIGURES 2, 3 and 4 are enlarged views partially in section of a fuse element with a shut-off valve plug therein shown in various positions.

Referring to FIGURE 1 of the drawing it will be seen that numeral 10 indicates a housing formed from an upper bell-shaped portion 11 and a lower base portion 13 having a fuel inlet port 12 and a fuel outlet port 14. The bell-shaped portion of the housing is attached to the base portion through means of a stud 15 and nut 17. Located within the lower portion of the housing are suitable partition means indicated generally by the numeral 16, which separate the interior of the housing 10 into an inlet chamber 18 and an outlet chamber 20. A plurality of filter or fuse assemblies 22 are attached to the deck plate portion of the partition means 16 and are retained in position by the fuse locating band 24 and the upper portion 11 of the housing. The direction of flow through the unit is indicated by the arrows.

Each filter or fuse assembly 22 includes a metal tube 26 having a plurality of perforated ports 28 surrounding a compressible porous tubular edge-type filter element 30 formed from a plurality of washers in registered face-to-face contact. A nipple-like ferrule 32 is suitably connected to one end of the tube and is in abutment with one end of the filter element. A retainer washer 34 is located at the other end of the tube and a movable piston-like endplate 36 is located within the tube and is in abutment with the other end of the filter element. A preloaded piston spring 38 is located between the retainer washer 34 and the piston 36 for placing the edge-type filter element under the desired calibrated precompression. The washers which are used in the filter element may be formed from paper, cellulose, or other suitable fibrous or non-fibrous materials and are arranged so that flow through the filter element will be via the radially extending pores formed between the washers. The filter element may also be formed by utilizing a ribbon-like material wound edgewise. The method for winding and making the ribbon type element is disclosed and claimed in my Patent No. 2,421,704. In the arrangement shown in FIGURE 1, flow will be from outside the filter element to inside the filter element. For additional details regarding this type of fuse assembly reference may be made to my Patent No. 3,117,925 and Patent No. 3,151,071.

It will be seen from FIGURES 2, 3 and 4 that the nipple-like ferrule 32 of each fuse element is formed with a tapered valve seat 40. Suspended above this tapered seat is a tapered valve plug 42 which is attached to the fuse piston 36 through means of a relatively thin soft axially extending wire 44 having a non-axial S shaped portion 46 therein. During normal operation, the plug will remain sufficiently above the tapered seat 40, as shown in FIGURE 2, so as not to interfere with the flow of fuel through the ferrule outlet.

Under those conditions where water or solid contamination is encountered in sufficient quantities to increase the pressure drop across the fuse element to a predetermined value (e.g. 25 p.s.i., or lower, if the normal pumping system is not capable of operating at 25 p.s.i. or more), then fuse piston 36, which is subjected to a pressure differential equal to the pressure drop across the filter element, will move towards the ferrule 40, as shown in FIGURE 3, and compress the edge-type filter element to a shorter length. Such compressive movement will permit the tapered plug 42 to drop into engagement with the tapered seat 40 and prevent further fuel flow through the ferrule outlet.

If the connection between the tapered plug 42 and the piston 36 were a rigid rod or a straight wire, the resilience of the edge-type element would cause the piston to move away from the nipple end 40 of the fuse element, once the flow is stopped through the nipple outlet by the tapered plug. This is due to the fact that once flow stops through the fuse element, there will no longer be any pressure difference between the inside and outside of the edge-type element. Thus, with such a connection, the tapered plug would continuously move between an open and closed position and would be ineffective to stop flow through the ferrule, as desired.

In order to prevent the foregoing condition, the wire 44, which is used to attach the plug to the piston, has an S-shaped section 46, which functions in the following manner. Once the tapered plug moves to a closed position by engaging the tapered seat, the pressure against the plug will maintain it in the closed position and the resilience of the edge-type filter element will move the piston away from the nipple end of the fuse assembly. Such movement of the piston will cause the soft wire 44 to tend to axially straighten in its S section 46, as shown in FIGURE 4, but the plug will remain in engagement with the nipple seat. It should be noted that the wire must be relatively thin and soft to permit the straightening of same by the forces in operation. Furthermore, the tapered plug has an included angle of about 15° to permit it to lock once it has been pushed into the outlet of the fuse nipple. It will be understood that by changing the length of the wire (the distance the plug has to travel before it enters the nipple), the fuel monitoring device can be calibrated to shut off at any desired differential pressure. The longer the wire for any given fuse length, the less pressure differential is needed to prevent seepage. Conversely, with a shorter wire, a greater pressure differential is needed to accomplish the same effect.

Those acquainted with this art will readily understand that the invention set forth herein is not necessarily limited and restricted to the precise and exact details presented and that various changes and modifications may be resorted to without departing from the spirit of my invention. Accordingly, I do not desire to be limited to the specific details described herein primarily for purposes of illustration, but instead desire protection falling within the scope of the appended claims.

Having thus described the various features of the invention, what I claim as new and desire to secure by Letters Patent is:

1. A filter unit comprising a housing having a plurality of inlet ports and a single outlet port therein, a layered edge-type compressible tubular element located within said housing and having radially extending pores formed between said layers for permitting flow of fluid therethrough from the outside of the element to the inside of the element, said tubular element having one end thereof in abutment with said housing and in alignment with said outlet port, a movable piston member in abutment with the other end of said tubular element, said piston member having one side thereof communicating with the fluid outside the tubular element and the other side thereof communicating with the fluid inside the tubular element so that when the differential pressure thereacross increases above a predetermined value the piston member will move and compress said tubular element to a shorter length, resilient means operatively connected to said housing and said piston member for urging said piston member against said tubular element, and valve means operatively connected to said piston member for closing said outlet port at differential pressures above a predetermined value and after closure at all subsequent differential pressures below said predetermined value.

2. A filter unit, as defined in claim 1, wherein said housing includes a perforated tube.

3. A filter unit, as defined in claim 2, wherein said edge-type compressible tubular element is formed of a plurality of washers stacked in registered face-to-face contact.

4. A filter unit, as defined in claim 2, wherein said edge-type compressible tubular element is formed of a ribbon-like material wound edgewise.

5. A filter unit, as defined in claim 2, wherein said perforated tube includes a nipple-like ferrule at one end thereof for forming said outlet port.

6. A filter unit, as defined in claim 5, wherein said valve means includes a movable valve plug operatively connected to said piston member for movement therewith towards said ferrule and a valve seat formed within said ferrule for receiving and locking said valve plug in a closed position.

7. A filter unit, as defined in claim 6, wherein said valve plug and valve seat are tapered and have an included angle of approximately 15°.

8. A filter unit, as defined in claim 6, wherein said connection between said piston member and valve plug includes means which is effectively non-deformable when said piston member moves said valve plug towards said ferrule and is deformable after the valve plug is locked in its closed position and the piston member moves away from said ferrule.

9. A filter unit, as defined in claim 8, wherein said connective means is a relatively thin soft axially extending wire having a non-axial portion capable of axially straightening out after the valve plug is locked in its closed position and the piston member moves away from said ferrule.

10. A filter unit, as defined in claim 9, wherein the non-axial portion of said wire is a substantially S-shaped portion.

11. A filter unit comprising a housing having a plurality of inlet ports and a single outlet port therein, a compressible tubular filtering element located within said housing for permitting flow of fluid therethrough from the outside of the element to the inside of the element, said tubular element having one end thereof in abutment with said housing and in alignment with said outlet port, means for placing said tubular element under a predetermined precompression, a movable member operatively connected to said tubular filtering element, said member being movable when the differential pressure across said tubular filtering element increases above a predetermined value, and valve means operatively connected to said member for closing said outlet port at differential pressures above a predetermined value and after closure at all subsequent differential pressures below said predetermined value.

12. A filter unit comprising a housing having a plurality of inlet ports and a single outlet port therein, a compressible tubular filtering element located within said housing for permitting flow of fluid therethrough from the outside of the element to the inside of the element, said tubular element having one end thereof in abutment with said housing and in alignment with said outlet port, a movable member in abutment with the other end of said tubular element, means for placing said tubular element under a predetermined precompression, valve means having a first position for permitting flow through said outlet port and a second position for closing said outlet port and preventing flow therethrough, and means operatively connected to said member and said valve means for effecting movement of said valve means from said first position to said second position upon movement of said member at pressure differentials across said filtering element above a predetermined value, said valve means being constructed and arranged to be maintained in said second position after movement thereto at all subsequent pressure differentials below said predetermined value while operatively connected as previously recited.

No references cited.

REUBEN FRIEDMAN, *Primary Examiner.*

W. S. BRADBURY, *Assistant Examiner.*